UNITED STATES PATENT OFFICE.

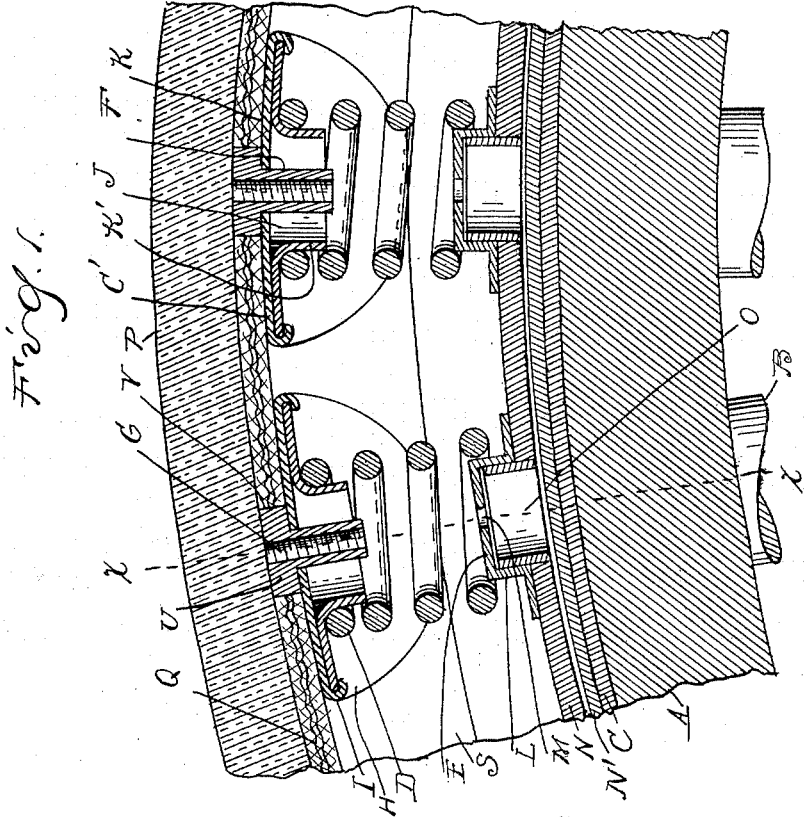
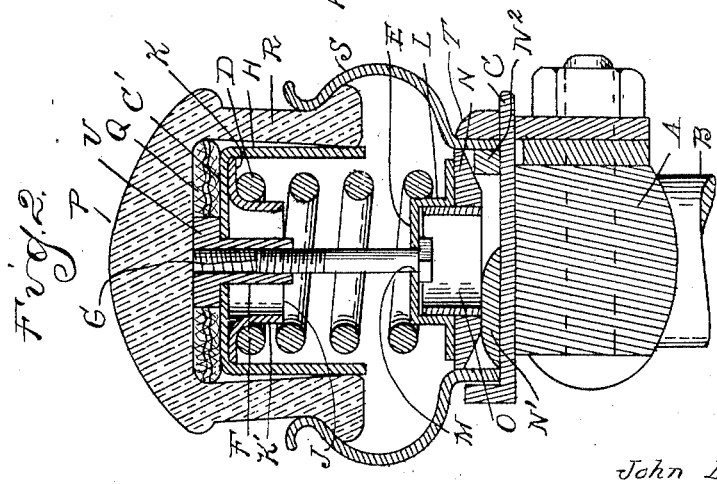

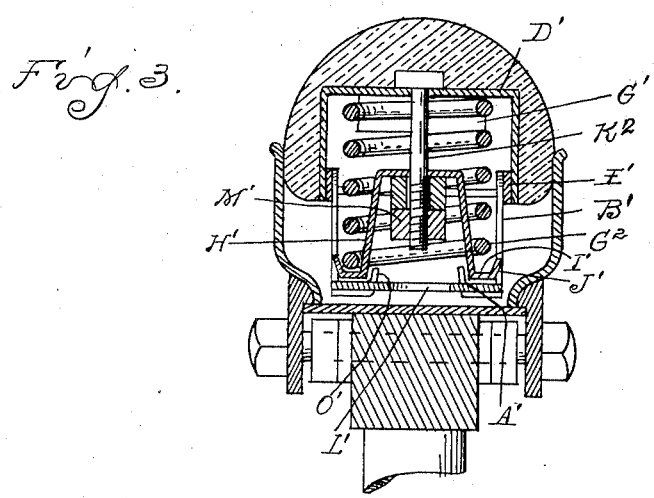
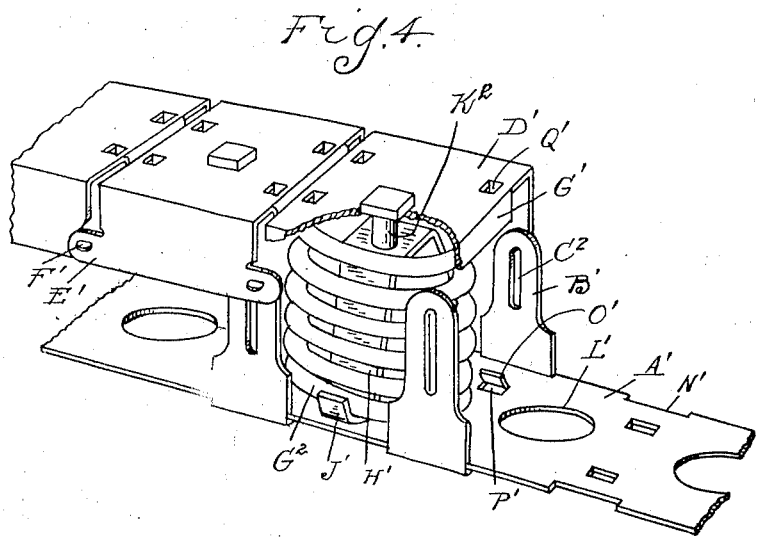

JOHN DAVIS, OF DETROIT, MICHIGAN.

SPRING-TIRE.

1,335,046.   Specification of Letters Patent.   Patented Mar. 30, 1920.

Application filed October 28, 1915. Serial No. 58,318.

*To all whom it may concern:*

Be it known that I, JOHN DAVIS, a citizen of the United States of America, residing at Detroit, in the county of Wayne and State of Michigan, have invented certain new and useful Improvements in Spring-Tires, of which the following is a specification, reference being had therein to the accompanying drawings.

The invention relates to spring tires and consists in the provision of a spring tire in which the spring elements are all demountable as a unitary structure from the wheel felly; in the provision of a plurality of spring elements positioned between concentrically arranged annular members; in the provision of spring elements that may be initially held under compression so as to facilitate the ready assembling of the spring elements between the concentrically-arranged members; in the provision of a construction of spring tire that will permit ready access to the parts for repairing or replacing the spring elements. Further, the invention consists in certain details of construction, arrangements and combinations of parts as will more fully hereinafter appear.

In the drawings,—

Figure 1 is a vertical central longitudinal section through a portion of a wheel felly and a tire embodying my invention;

Fig. 2 is a section on the line $x$—$x$ of Fig. 1;

Figs. 3 and 4 illustrate a modified construction.

The tire embodying my invention is primarily intended for use on automobiles, but it is of course adapted for use in other vehicles.

A designates the felly of the wheel and B the spokes. C is the permanent band attached to the felly and upon which is mounted the spring tire. The spring tire is made up of a plurality of spring elements each of like construction. Each of these elements is composed of an outer member C′, a coil spring D and an inner member E. Carried by one of the members as the member C′ is a nut F with which the end of a bolt G is adapted to engage, the bolt G acting to temporarily compress the coil spring between the abutments E and C′, as will more fully hereinafter appear. The member C′ is herein shown as having inwardly-extending sides H, and as having the ends I turned inward, as will be noted upon reference to Fig. 1. Secured against the inner face of the member C′ by means of the flange K or by other means, is a guide J having an inwardly-extending neck K′ arranged within the end of the spring. The member E is also shown as provided with a neck portion as L. This neck portion however, is cup-shaped and is provided with a central aperture M for receiving the bolt G.

N is a band or slip rim provided at spaced intervals with a plurality of collars O and these collars are adapted to be inserted within the cup-shaped portions L of the members E. P is the tread section proper surrounding the spring elements. In the structure shown in Figs. 1 and 2, an endless band Q is preferably arranged around the spring elements. This band may be made of heavy fabric, leather or any other suitable material. The tread section P has inwardly-extending flanges R that are arranged between side plates S. When the parts are in assembled relation upon the felly, the band or slip rim N is spaced from the permanent band C by the rounded member N′ thereon and the wedging member N² between said bands N and C, and the side plates are secured in place as by means of clips T.

In assembling the tire the springs are arranged between the members E and C′ and compressed therebetween by means of bolts G, as shown in Fig. 2. The spring elements are then positioned within the outer concentric member Q and preferably in order to circumferentially space the spring elements properly within the band, the nuts F are provided with heads U that are inserted within apertures V in the band Q, or otherwise interlocked therewith. The band or slip rim N is then arranged within the spring elements, with the collars O alining with the members E. A suitable tool is inserted within the collar O and the bolts G removed. Upon the removing of the bolts G the springs tend to spread the opposed abutments C′ and E and this will exert pressure upon the inner and outer bands. The tread member P may then be arranged over the outer band Q, or preferably the outer band Q may be positioned within the tread member P before the spring elements are engaged therewith. One of the side plates S is positioned upon the permanent band C and the tread member and the spring elements composed of the bands N and Q are then inserted laterally into engagement with the rounded member N' on band C and then the wedging member N² is inserted between band N and band C. The other side plate S is then positioned upon the band C and secured in place by the clamping members T.

By the arrangement just described it will be apparent that the placing of the spring elements temporarily under compression permits the parts to be readily assembled, while by forming the parts so that the spring portion of the tire may be laterally slid as a unit into engagement with the felly, the attaching or detaching of the tire may be readily performed. When it is desired to repair a spring element the spring section of the tire is removed from the felly and a bolt G inserted through the collar O into engagement with the nut F and the spring compressed between the members E and C'. The element then may be withdrawn without disturbing the remaining elements.

In Figs. 3 and 4 I have shown a modification in which the slip rim A' is provided with outwardly-extending lugs B' radially slotted at C². The outer abutment D' is in the form of a cap having ears E' extending therefrom which are connected by pins F' to the slotted lugs on the inner band. At the ends the cap members have inwardly-extending flanges G' forming guides or abutments for the spring. The spring G² has one end abutting against the cap member D' and has the opposite end engaging an abutment H' formed by an inverted U-shaped member having laterally-extending feet I' that terminate in outwardly-extending flanges J'. K² is a bolt for temporarily holding the spring under compression, so as to facilitate assembling of the parts. The slip rim A' is provided with an aperture L' to permit a tool to be inserted therethrough into engagement with the nut M' on the bolt K². Preferably the slip rim A' is provided with cut-away portions or recesses N³ upon opposite sides thereof to receive the member B', while the inner end of the member B' is bent beneath the slip rim A' and has an outwardly-extending flange O' projecting through an aperture P' in the slip rim A'.

In assembling the parts the spring is compressed between the cap member D' and the abutment H' by means of the bolt K². The spring elements are then arranged upon the slip rim A' and the lugs B' positioned upon the slip rim and secured to the ears E' on the cap members. When so mounted the nut M' is removed, which permits the spring to expand. The parts may then be assembled on the felly band in the manner described in connection with Figs. 1 and 2.

If desired, in order to form a guide for the outer end of the spring, the cap member D' may be provided with a plurality of inwardly-extending lugs Q' which form a centering means for the outer convolution of the spring. In the construction last described the outer concentric member is omitted and the tread member proper is arranged directly over the cap members. However, the outer concentric member might be employed in this construction.

What I claim as my invention is:—

1. In a spring tire, a spring section detachable as a unit from a wheel felly, said spring section including a slip rim and a plurality of spring elements independently engageable with the rim, and means for independently compressing the spring elements, said means being adapted to release the spring elements from compression when the elements are assembled on the rim.

2. In a spring tire, a spring section composed of a slip rim engageable with or detachable from the wheel felly and a plurality of spring elements each comprising an outer abutment, an inner abutment, a spring and a member for temporarily holding said spring under compression between said abutments, said slip rim having apertured portions permitting access to said compressing member whereby when said spring elements are assembled upon the slip rim said elements may be released from compression.

3. A spring tire attachable as a unit to a wheel felly comprising circumferentially-arranged members, a plurality of spring elements between said members each composed of spaced abutments, and a spring between said abutments, and internal means for temporarily compressing said spring between said abutments, removable to permit the spring to exert an expansible pressure upon said circumferentially-arranged members.

4. In a spring tire, a spring section composed of circumferentially-arranged members and a plurality of spring elements, each of said elements comprising opposed abutments and a coil spring arranged between said opposed abutments, and a member for temporarily compressing the spring between said opposed abutments, one of said circumferentially-arranged members being provided with apertures permitting access to the members for temporarily holding the springs under compression, whereby the springs may be released from compression when assembled between said circumferentially-arranged members.

5. A spring tire, comprising a spring section composed of circumferentially-arranged members and a plurality of spring elements each comprising spaced abutments, a coil spring between said abutments, a bolt acting to temporarily hold the spring under compression between said abutments, and seats upon one of the circumferentially arranged members with which one of the abutments of each spring element is adapted to engage, said last-mentioned circumferentially-arranged member being provided with apertured portions providing access to said bolts to release the springs from compression when the spring elements are assembled between said circumferentially-arranged members.

6. In a spring tire, the combination with circumferentially-arranged members, the inner member being provided with a plurality of outwardly-extending hollow collars, and a plurality of spring elements each composed of spaced abutments, one abutment of each of the spring elements being adapted to engage one of the collars upon the inner member and to seat thereupon, a guide upon the other abutment for the spring, and means insertible through said hollow collar for compressing the spring between said opposed abutments, for the purpose described.

7. In a spring tire, a spring section detachable from and attachable to a wheel felly as a unit, said spring section comprising a slip rim and a plurality of spring elements engageable with said slip rim independently of each other, and, means within said spring section for independently compressing the spring elements, said means adapted to release said spring elements from compression when the same are assembled on said slip rim.

In testimony whereof I affix my signature in presence of two witnesses.

JOHN DAVIS.

Witnesses:
  JAMES P. BARRY,
  PHYLLIS COBURN.